United States Patent
Jiang et al.

(10) Patent No.: US 12,483,148 B2
(45) Date of Patent: Nov. 25, 2025

(54) FLYBACK CONVERTER WITH HIGH EFFICIENCY AND CONTROL METHOD THEREOF

(71) Applicant: Joulwatt Technology Co., Ltd., Hangzhou (CN)

(72) Inventors: Xianghua Jiang, Hangzhou (CN); Junming Zhang, Hangzhou (CN); Pitleong Wong, Hangzhou (CN); Xiangyong Xu, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 252 days.

(21) Appl. No.: 18/544,402

(22) Filed: Dec. 18, 2023

(65) Prior Publication Data

US 2024/0204674 A1    Jun. 20, 2024

(30) Foreign Application Priority Data

Dec. 19, 2022 (CN) .......................... 202211632065.9
Nov. 6, 2023 (CN) .......................... 202311470669.2

(51) Int. Cl.
*H02M 3/335* (2006.01)
*H02M 3/00* (2006.01)

(52) U.S. Cl.
CPC ......... *H02M 3/33571* (2021.05); *H02M 3/01* (2021.05)

(58) Field of Classification Search
CPC ........ H02M 1/0058; H02M 1/08; H02M 1/14; H02M 3/01; H02M 3/335; H02M 3/33507; H02M 3/33523; H02M 3/33569; H02M 3/33571
See application file for complete search history.

(56) References Cited

U.S. PATENT DOCUMENTS

| | | | |
|---|---|---|---|
| 2019/0036442 A1* | 1/2019 | Oh | H02M 3/33592 |
| 2022/0416644 A1* | 12/2022 | Xu | H02M 1/0009 |
| 2023/0198415 A1* | 6/2023 | Xu | H02M 1/32 363/21.12 |

FOREIGN PATENT DOCUMENTS

| | | | |
|---|---|---|---|
| CN | 205960954 U | * | 2/2017 |
| CN | 115149498 A | | 10/2022 |

OTHER PUBLICATIONS

Machine translation of CN-205960954, originally published Feb. 15, 2017. (Year: 2017).*

* cited by examiner

*Primary Examiner* — Fred E Finch, III
(74) *Attorney, Agent, or Firm* — IPro, PLLC (57) ABSTRACT

Disclosed is a high-efficiency flyback converter and a control method thereof. The flyback converter comprises: a transformer; a first switch transistor and a second switch transistor; a resonant capacitor; a control circuit, for controlling the second switch transistor to be turned on for a first time before the first switch transistor is turned on during a switching cycle, controlling the second switch transistor to maintain turn-off state during a first time stage, to control energy transmission between primary and secondary sides to include two time stages during a switching cycle, the first time stage lasts for a set time period during a freewheeling process. The present disclosure allows the main switch transistor to realize zero-voltage turn-on, thus reducing conduction loss of the primary and the secondary sides, reducing ripples of an output voltage and a current of the secondary side, and being beneficial to improving operating efficiency.

17 Claims, 7 Drawing Sheets

FLYBACK CONVERTER WITH HIGH EFFICIENCY AND CONTROL METHOD THEREOF

CROSS-REFERENCE TO RELATED APPLICATION

This application claims priority to a Chinese patent application No. 202211632065.9, which is filed on Dec. 19, 2022, published as CN116365882A on Jun. 30, 2023, and entitled "FLYBACK CONVERTER WITH HIGH EFFICIENCY AND CONTROL METHOD THEREOF", and a Chinese patent application No. 202311470669.2, which is filed on Nov. 6, 2023 and entitled "FLYBACK CONVERTER WITH HIGH EFFICIENCY AND CONTROL METHOD THEREOF", the entire contents of which are incorporated by reference in its entirety.

FIELD OF THE DISCLOSURE

The present disclosure relates to a technical field of switching power supply, in particular to a flyback converter with high efficiency and a control method of a flyback converter.

DESCRIPTION OF THE RELATED ART

With the rapid development of power electronics, switching converters are more and more widely used, especially, people put forward more requirements on switching converters with high power density, high reliability, and small size. Conventional low-power switching converter can be realized by flyback topology, which has advantages of simple structure and low cost. Wherein, an asymmetric half-bridge (AHB) flyback converter has an additional advantage of isolation, and under a condition that the number and complexity of devices are close to those of an ordinary flyback converter, the asymmetric half-bridge flyback converter can allow two switch transistors to realize zero-voltage turn-on (zero-voltage switching, ZVS), recover energy on leakage inductor, and can easily realize self-driven synchronous rectification, which effectively improve efficiency and at the same time reduces transformer size, thus becoming a better application solution.

Figure 1A:
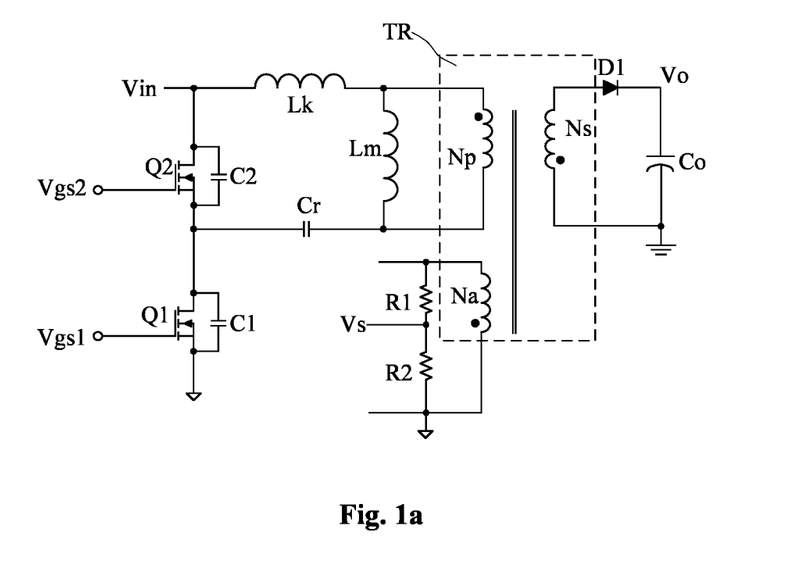
FIG. 1a shows a schematic diagram of a circuit structure of a conventional flyback converter.
Figure 1B:
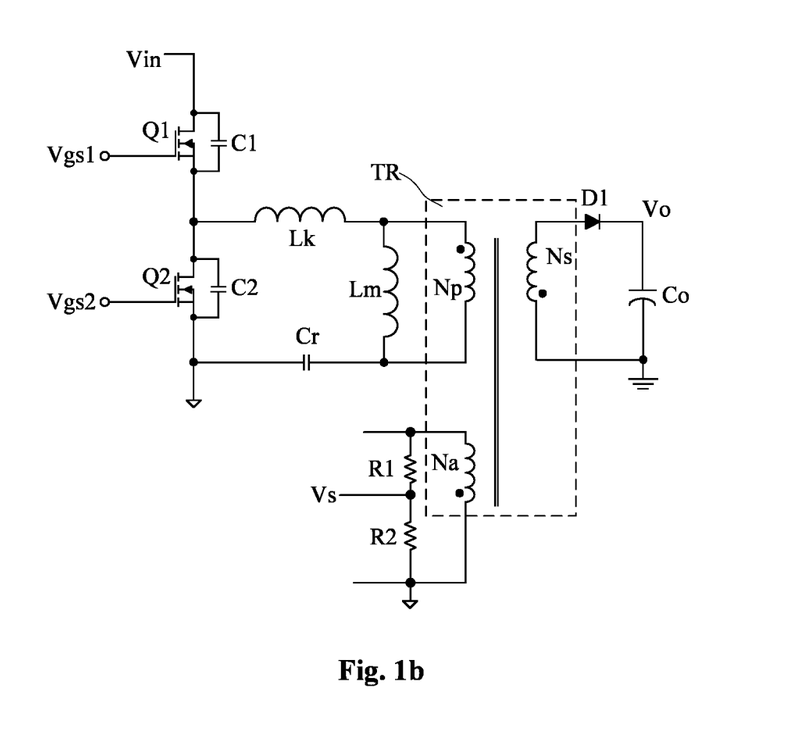
FIG. 1b shows a schematic diagram of a circuit structure of another conventional flyback converter.

FIGS. 1a and 1b show circuit diagrams of two conventional asymmetric half-bridge flyback converters, respectively. In FIG. 1a, an upper switch transistor Q2 is a second switch transistor, which is also referred to as an auxiliary switch transistor; and a lower switch transistor Q1 is a first switch transistor, which is also referred to as a main switch transistor. In FIG. 1b, an upper switch transistor Q1 is a first switch transistor, which is also referred to as a main switch transistor; and a lower switch transistor Q2 is a second switch transistor, which is also referred to as an auxiliary switch transistor. Operation principles of the two circuits are basically the same. When the converter is operated under heavy load, the two switch transistors are generally operated in complementary state; while under light load, the converter is generally operated in a manner for reducing switching frequency to reduce conduction loss, thus entering a discontinuous conduction mode (DCM mode). Taking FIG. 1a as an example, operating waveforms in DCM mode are shown in FIG. 2, wherein waveforms labeled Vgs1 and Vgs2 show driving voltage signals of the switch transistor Q1 and the switch transistor Q2, respectively; waveform labeled $i_{Lm}$ shows an excitation current on a primary winding Np; waveform labeled $i_{Lk}$ shows a current through a leakage inductor of the primary winding Np; waveform labeled Vsw shows a source-drain voltage of the switch transistor Q1; waveform labeled is shows a secondary-side current; waveform labeled Vcr shows a voltage across a resonant capacitor Cr.

Figure 2:
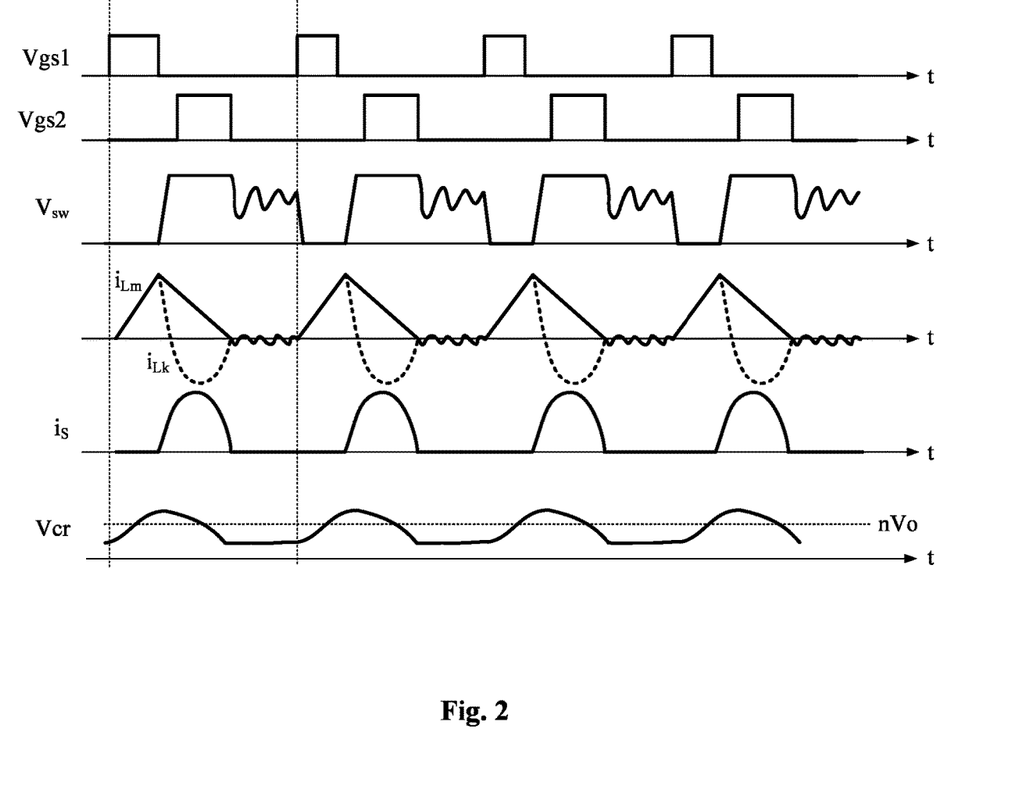
FIG. 2 shows a timing waveform diagram of a conventional flyback converter in DCM mode.

Referring to FIG. 2, during a turn-on period of the switch transistor Q1, the conventional asymmetric half-bridge flyback converter magnetizes an excitation inductor Lm and charges the resonant capacitor Cr; generally, during a freewheeling process of the secondary side, the excitation inductor Lm demagnetizes and energy of the excitation inductor is transmitted to the secondary side, at this time, if the switch transistor Q2 is turned on, the leakage inductor Lk of the transformer resonates with the resonant capacitor Cr, and energy on the resonant capacitor Cr is also transmitted to the secondary side, thus energy transmission from the excitation inductor Lm and the resonant capacitor Cr can be achieved simultaneously. However, when an input voltage is high and load is light, the converter may operate in DCM state. At this time, the control scheme will control the switch transistor Q1 to be turned on with a high source-drain voltage (hard turn-on), which will bring additional conduction loss and lead to low system efficiency.

Therefore, it is necessary to provide an improved technical proposal to overcome the above technical problems in the prior art.

SUMMARY OF THE DISCLOSURE

In order to solve the above technical problems, the present disclosure provides a flyback converter with high efficiency and a control method of the flyback converter, wherein, in a switching cycle, energy transmission between primary side and secondary side is controlled to be performed in two time stages, which can allow a main switch transistor to realize zero-voltage turn-on, reduce conduction loss of the primary side and the secondary side, reduce ripples of an output voltage and a current of the secondary side, and is beneficial to improving operating efficiency.

According to a first aspect of the present disclosure, there is provided a flyback converter with high efficiency, comprising:
 a transformer;
 a first switch transistor and a second switch transistor, which are connected in series between a voltage input terminal and reference ground;
 a resonant capacitor, wherein a resonant loop of the flyback converter is formed based on the resonant capacitor and a leakage inductor of the transformer when the second switch transistor is in turn-on state;
 a control circuit, configured to generate control signals for the first switch transistor and the second switch transistor,
 wherein the control circuit is configured to control, during a switching cycle, the second switch transistor to be turned on for a first time before the first switch transistor is turned on, and to control the second switch transistor to maintain turn-off state during a first time stage of the flyback converter, so as to control energy transmission between a primary side portion and a secondary side portion of the flyback converter to include two time stages during a switching cycle, wherein the two time stages include the first time stage and a second time stage, the first time stage lasts for a set time period during a freewheeling process of the flyback converter, and the second time stage lasts for the first time during which the second switch transistor is turned on.

Optionally, the flyback converter operates in DCM mode, and a maximum value, that can be reached during the first time, of an absolute value of a current through an excitation inductor of the flyback converter is less than a maximum value, that can be reached during a turn-on period of the first switch transistor, of an absolute value of the current through the excitation inductor of the flyback converter.

Optionally, when a switching frequency of the flyback converter is higher than a preset frequency, the flyback converter operates in BCM mode for N consecutive switching cycles, then operates in DCM mode for M consecutive switching cycles following the N consecutive switching cycles, and that cycle of modes repeats, wherein both N and M are positive integers.

Optionally, timing is started when the second switch transistor is turned on, and a turn-off trigger signal for controlling the second switch transistor to be turned off is outputted when a timing value obtained by the timing reaches the first time.

Optionally, the first time has a preset fixed value; or
the first time is proportional to the turn-on period of the first switch transistor.

Optionally, the control circuit includes:
a feedback unit, configured to generate a compensation signal according to an output feedback signal of the flyback converter;
a first control unit, configured to generate a turn-on signal of the second switch transistor according to the compensation signal and a switching frequency of the flyback converter, and generate a turn-off trigger signal of the second switch transistor after the second switch transistor is turned on for the first time.

Optionally, the first control unit includes:
a frequency limitation threshold setting circuit, configured to generate a reference signal representing a frequency limitation threshold value of the flyback converter according to the compensation signal;
a frequency detection circuit, configured to generate a frequency detection signal according to the turn-on signal of the second switch transistor in a previous switching cycle;
a comparison circuit, having a first input terminal receiving the frequency detection signal and a second input terminal receiving the reference signal, wherein the comparison circuit is configured to output a turn-on trigger signal when the frequency detection signal reaches the reference signal, so as to control the second switch transistor to be turned on;
a turn-off control circuit, configured to output the turn-off trigger signal after the second switch transistor is turned on for the first time, to control the second switch transistor to be turned off.

Optionally, the reference signal and the frequency detection signal are both timing signals, or the reference signal and the frequency detection signal are both time-dependent voltage signals.

Optionally, the turn-off control circuit is configured to: obtain an increased value of a voltage across the resonant capacitor by sampling after the first switch transistor is turned on in a previous switching cycle; and to perform real-time detection on a decreased value of the voltage across the resonant capacitor after the second switch transistor is turned on in a current switching cycle, and output the turn-off trigger signal when the decreased value is equal to the increased value.

Optionally, in a switching cycle, a period, which starts when the second switch transistor is turned off and ends when the first switch transistor is turned on, lasts for less than a preset time.

Optionally, the transformer includes an auxiliary winding, and the voltage across the resonant capacitor is obtained by performing sampling based on a signal of the auxiliary winding.

According to a second aspect of the present disclosure, there is provided a control method of a flyback converter with high efficiency, and the flyback converter comprises a transformer, a first switch transistor, a second switch transistor, and a resonant capacitor. The control method comprises following steps in each switching cycle:
controlling the second switch transistor to be turned on for a first time before the first switch transistor is turned on, so as to control a leakage inductor of the transformer to resonate with the resonant capacitor and transfer energy on the resonant capacitor to a secondary side portion of the flyback converter;
controlling the first switch transistor to be turned on after the second switch transistor is turned off, so as to charge an excitation inductor of the transformer and the resonant capacitor;
controlling the first switch transistor to be turned off to control the excitation inductor of the transformer to be demagnetized, so as to transfer energy on the excitation inductor to the secondary side portion of the flyback converter.

Optionally, method for controlling the second switch transistor to be turned on includes:
generating a compensation signal according to an output voltage of the flyback converter;
generating a reference signal representing a frequency limitation threshold value of the flyback converter according to the compensation signal;
generating a frequency detection signal according to a turn-on signal of the second switch transistor in a previous switching cycle;
controlling the second switch transistor to be turned on when the frequency detection signal reaches the reference signal.

Optionally, the flyback converter operates in DCM mode, and a maximum value, that can be reached during the first time, of an absolute value of a current through the excitation inductor of the flyback converter is less than a maximum value, that can be reached during a turn-on period of the first switch transistor, of an absolute value of the current through the excitation inductor of the flyback converter.

Optionally, when a switching frequency of the flyback converter is higher than a preset frequency, the flyback converter operates in BCM mode for N consecutive switching cycles, then operates in DCM mode for M consecutive switching cycles following the N consecutive switching cycles, and that cycle of modes repeats, where both N and M are positive integers.

Optionally, method for controlling the second switch transistor to be turned off includes:
starting timing when the second switch transistor is turned on, and controlling the second switch transistor to be turned off when a timing value obtained by the timing reaches the first time; or
in a previous switching cycle, obtaining an increased value of a voltage across the resonant capacitor by sampling after the first switch transistor is turned on, and in a current switching cycle, performing real-time detection on a decreased value of the voltage across the resonant capacitor after the second switch transistor is turned on, and controlling the second switch transistor to be turned off when the decreased value is equal to the increased value.

Optionally, the first time has a preset fixed value; or the first time is proportional to the turn-on period of the first switch transistor.

Embodiments according to the present disclosure at least bring following beneficial effects:

According to embodiments of the present disclosure, in a switching cycle, a resonant process performed based on the leakage inductor of the transformer and the resonant capacitor, and a demagnetization process of the excitation inductor of the transformer are performed in different time stages, so that energy transmission between the primary side and the secondary side of the flyback converter includes two time stages in a switching cycle, thereby allowing the main switch transistor (i.e., the first switch transistor) to realize zero-voltage turn-on, reducing conduction loss of the primary side and the secondary side, reducing ripples on an output voltage and a current of the secondary side, and being beneficial to improving operating efficiency.

It should be noted that the above general description and the following detailed descriptions are exemplary and explanatory only and are not intended to limit the present invention.

BRIEF DESCRIPTION OF THE DRAWINGS

The above and other objects, features and advantages of the present invention will become more apparent from the description below with reference to the accompanying drawings.

DETAILED DESCRIPTION OF EMBODIMENTS OF THE DISCLOSURE

In order to make the present invention easily understood, more comprehensive descriptions of the present invention will be given below by referring to the accompanying drawings. Preferred embodiments of the invention are shown in the drawings. However, the present invention may be implemented in different forms and is not limited to the embodiments described herein. Rather, these embodiments of the present disclosure are provided for making the disclosure of the invention more thoroughly and fully understood.

In the present disclosure, a flyback converter can operate in discontinuous conduction mode (DCM mode) or continuous conduction mode (CCM mode). In the present disclosure, a technical proposal of the present invention will be illustrated by taking an asymmetric half-bridge flyback converter AHB as an example. However, it should be understood that the disclosed technical proposals of the present disclosure are also applicable to other types of flyback converters, such as active clamp flyback converters.

Figure 3:
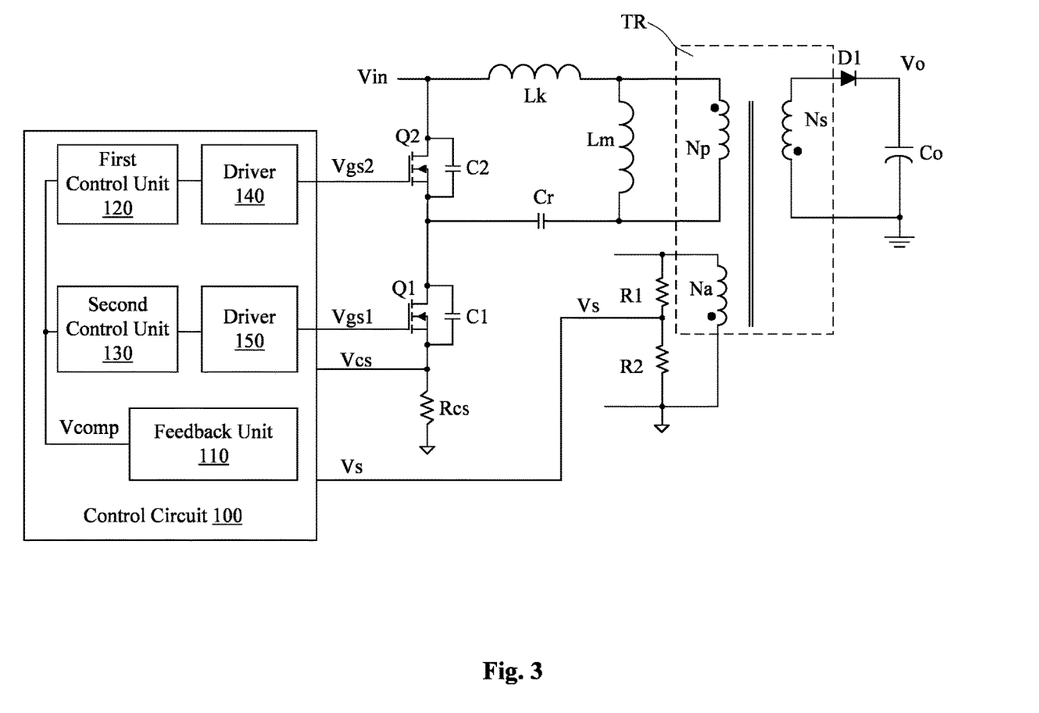
FIG. 3 shows a schematic diagram of a circuit structure of a flyback converter with high efficiency provided according to an embodiment of the present disclosure.

As shown in FIG. 3, in an embodiment of the present disclosure, a flyback converter with high efficiency (hereinafter referred to as a flyback converter) includes: a transformer TR including a primary winding Np, a secondary winding Ns, and an auxiliary winding Na; a first switch transistor Q1 (corresponding to a main switch transistor of the flyback converter, hereinafter referred to as switch transistor Q1); a second switch transistor Q2 (corresponding to an auxiliary switch transistor of the flyback converter, hereinafter referred to as switch transistor Q2); a resonant capacitor Cr; and a control circuit 100. The transformer TR, the switch transistor Q1, the switch transistor Q2, and the capacitor Cr in the flyback converter (also referred to herein as a converter) according to an embodiment of the present disclosure may be connected to form a structure according to FIG. 1a. However, it will be understood that in other embodiments of the present disclosure, the transformer TR, the switch transistor Q1, the switch transistor Q2 and the capacitor Cr may also be connected to form a structure according to FIG. 1b.

A drain of the switch transistor Q2 is connected to an input terminal for receiving an input voltage Vin, and a gate of the switch transistor Q2 is connected to the control circuit 100; a drain of the switch transistor Q1 is connected to a source of the switch transistor Q2, a source of the switch transistor Q1 is connected to reference ground through a sampling resistor Rcs, a gate of the switch transistor Q1 is connected to the control circuit 100, and capacitors C1 and C2 are parasitic capacitors of the switch transistor Q1 and the switch transistor Q2, respectively. During a same switching cycle, the switch transistor Q1 and the switch transistor Q2 are turned on under time-sharing control, to transfer the input voltage Vin from a primary side portion to a secondary side portion of the flyback converter. In an optional embodiment, each of the switch transistor Q1 and the switch transistor Q2 is a NMOS field effect transistor or a GAN device.

An excitation inductor and a leakage inductor of the primary winding Np are equivalent to an inductor Lm and an inductor Lk, respectively, and may form a resonant loop with the resonant capacitor Cr and the switch transistor Q2 when the switch transistor Q2 is turned on.

The secondary side portion of the converter includes a rectifier (such as a diode) D1 and an output capacitor Co. An anode of the rectifier diode D1 is connected to the secondary winding Ns, and a cathode of the rectifier diode D1 is connected to an output terminal of the flyback converter. A positive electrode of the output capacitor Co is connected to the output terminal of the flyback converter, a negative electrode of the output capacitor Co is connected to the reference ground, and a homonymous end of the secondary winding Ns is also connected to the reference ground. Further, the output terminal of the flyback converter is connected to a load, and the load receives electrical energy (e.g., voltage and current) converted by the flyback converter. In some embodiments, the electrical energy converted by the flyback converter is transmitted to the load through a filter. In some embodiments, the filter may be a sub-component of the flyback converter, a periopheral (external) component of the flyback converter, and/or a sub-component of the load. In any case the load may use the electrical energy, which is filtered or unfiltered, from the flyback converter, to perform its function. Optionally, the load may include but is not limited to a computing device and related components, or any other type of electrical device and/or circuit that can receive voltage or current from the flyback converter.

In the present embodiment, the control circuit 100 is configured to: control, during a switching cycle, the switch transistor Q2 to be turned on for a first time (denoted T1) before the switch transistor Q1 is turned on, and control the switch transistor Q2 to maintain turn-off state during a first time stage of the flyback converter, so as to control energy transmission between the primary side portion and the secondary side portion of the flyback converter to include two time stages during a switching cycle. Thus, the main switch transistor (i.e., the switch transistor Q1) can be allowed to realize zero-voltage turn-on, thus reducing conduction loss of the primary side and the secondary side and ripples of an output voltage and a current of the secondary side, which is beneficial to improving operating efficiency. Wherein, the first time stage lasts for a set time period during a freewheeling process of the flyback converter, and the freewheeling process of the flyback converter corresponds to a time period in which the rectifier diode D1 of the flyback converter is turned on.

In an example, during a switching cycle, the control circuit 100 is configured to control the switch transistor Q2 to be turned on for a first time (denoted T1) before the switch transistor Q1 is turned on, then control the switch transistor Q1 to be turned on after the switch transistor Q2 is turned off, control the switch transistor Q2 to maintain turn-off state during the freewheeling process of the flyback converter after the switch transistor Q1 is turned off, and then control the switch transistor Q2 to be turned on again in a next switching cycle after the freewheeling process is finished. Thus, in a switching cycle, the resonant capacitor Cr is discharged to transfer energy to the secondary side portion of the converter during the first time (corresponding to a second time stage of the above-mentioned two time stages) when the switch transistor Q2 is turned on, and the excitation inductor Lm is demagnetized to transfer energy to the secondary side portion of the converter again during a set time period (corresponding to the first time stage of the above-mentioned two time stages) of the freewheeling process after the switch transistor Q1 is turned off. By control the switch transistor Q2 to maintain turn-off state during the freewheeling process of the flyback converter, the energy transmission between the primary side portion and the secondary side portion of the flyback converter can be performed in stages.

The control circuit 100 includes a feedback unit 110, a first control unit 120, a second control unit 130, a driver 140 and a driver 150. The second control unit 130 is connected to the gate of the switch transistor Q1 through the driver 150, the first control unit 120 is connected to the gate of the switch transistor Q2 through the driver 140, and a voltage detection pin Vs of the control circuit 100 is connected to the auxiliary winding Na.

The feedback unit 110 is configured to generate a compensation signal Vcomp according to the output voltage Vo of the flyback converter, for achieving real-time feedback of the current load of the flyback converter. As an example, a circuit structure of the feedback unit 110 may obtain the compensation signal Vcomp by using a conventional circuit structure such as a combined structure of an error amplifier and a compensation circuit, however, the present disclosure is not limited thereto.

The first control unit 120 is configured to supply a control signal Vgs2 to control the switch transistor Q2 to be turned on/off. In the present embodiment, the first control unit 120 is configured to generate a turn-on signal of the switch transistor Q2 according to the compensation signal Vcomp and a switching frequency of the flyback converter, and to generate a turn-off signal of the switch transistor Q2 after the switch transistor Q2 is turned on for the first time T1. The turn-on signal of the switch transistor Q2 may be, for example, a control signal Vgs2 in high voltage level state, and the turn-off signal of the switch transistor Q2 may be, for example, the control signal Vgs2 in low voltage level state.

Figure 4:
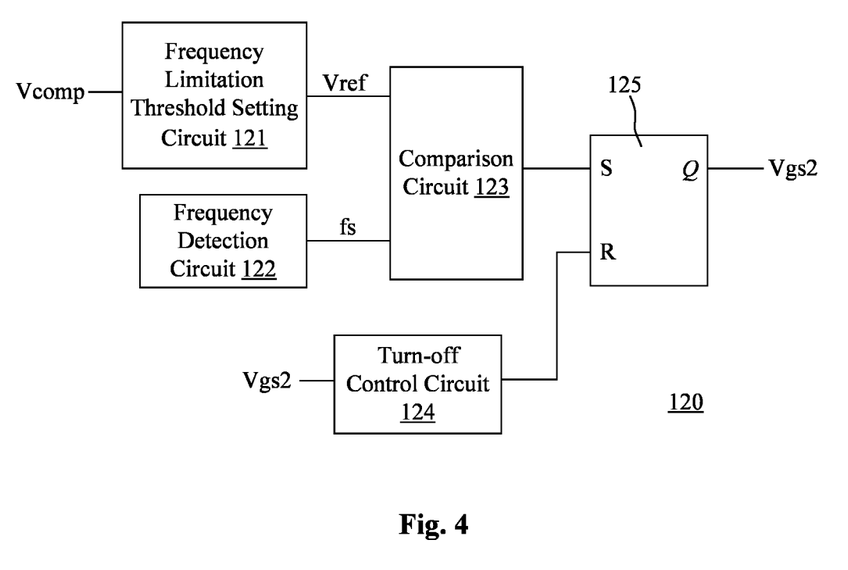
FIG. 4 shows a structural schematic diagram of a first control unit provided according to an embodiment of the present disclosure.

As an example, referring to FIG. 4, the first control unit 120 includes a frequency limitation threshold setting circuit 121, a frequency detection circuit 122, a comparison circuit 123, a turn-off control circuit 124 and an RS trigger 125.

The frequency limitation threshold setting circuit 121 is configured to generate a reference signal Vref representing a frequency limitation threshold value of the flyback converter according to the compensation signal Vcomp. The frequency detection circuit 122 is configured to generate a frequency detection signal fs according to the turn-on signal of the switch transistor Q2 in a previous switching cycle. A first input terminal of the comparison circuit 123 receives the frequency detection signal fs, and a second input terminal of the comparison circuit 123 receives the reference signal Vref. When the frequency detection signal fs reaches the reference signal Vref, the comparison circuit 123 outputs a turn-on trigger signal to a set terminal of the RS trigger 125, so that the RS trigger 125 is controlled to output the control signal Vgs2 in high voltage level state to the control terminal of the switch transistor Q2 through the driver 140 to control the switch transistor Q2 to be turned on.

In some embodiments, the reference signal Vref and the frequency detection signal fs are both timing signals. As an example, in these embodiments, the frequency limitation threshold setting circuit 121 may be configured to output a corresponding time threshold value as the reference signal Vref according to the magnitude of the compensation signal Vcomp, thus the reference signal Vref can represent the frequency limitation threshold value of the flyback converter. The frequency detection circuit 122 is configured to start timing when the switch transistor Q2 is turned on (i.e., when the turn-on signal of the switch transistor Q2 is active) in a previous switching cycle, and a timing value obtained by the timing may serve as the frequency detection signal fs. When the timing value obtained by the frequency detection circuit 122 reaches the time threshold value outputted by the frequency limitation threshold setting circuit 121, the comparison circuit 123 is configured to output the turn-on trigger signal to trigger the switch transistor Q2 to be turned on, and at the same time trigger the frequency detection circuit 122 to restart timing.

In some other embodiments, the reference signal Vref and the frequency detection signal fs are both time-dependent voltage signals. As an example, in these embodiments, the frequency limitation threshold setting circuit 121 may be configured to alternately output a preset first voltage threshold value (e.g., a non-zero voltage value) and a second voltage threshold value (e.g., a zero voltage value) as the reference signal Vref, for example, the frequency limitation threshold setting circuit 121 may be configured to output the first voltage threshold value as the reference signal Vref in odd-numbered switching cycles and output the second voltage threshold value as the reference signal Vref in even-numbered switching cycles. The frequency detection circuit 122 is configured to charge (or discharge) the capacitor by use of the compensation signal Vcomp when the turn-on signal of the switch transistor Q2 is active (that is, when the switch transistor Q2 is turned on) in a previous switching cycle, and the voltage across the capacitor can serve as the frequency detection signal fs. The comparison circuit 123 is configured to output the turn-on trigger signal to trigger the switch transistor Q2 to be turned on when the voltage across the capacitor is charged to reach a first voltage threshold value (or when the voltage across the capacitor is discharged to a second voltage threshold value), and at the same time, the frequency detection circuit 122 is triggered to start discharging (or charging) the capacitor by use of the compensation signal Vcomp.

It should be noted that the first voltage threshold value and the second voltage threshold value may represent ideal values, and in practical applications, other values within an allowed error range corresponding to the ideal values can also be used to serve as the first voltage threshold value and/or the second voltage threshold value.

The turn-off control circuit 124 is configured to output a turn-off trigger signal to a reset terminal of the RS trigger 125 after the switch transistor Q2 is turned on for the first time T1, thereby controlling the RS trigger 125 to output the control signal Vgs2 in low voltage level to the control terminal of the switch transistor Q2 through the driver 140, so as to control the switch transistor Q2 to be turned off.

Figure 5:
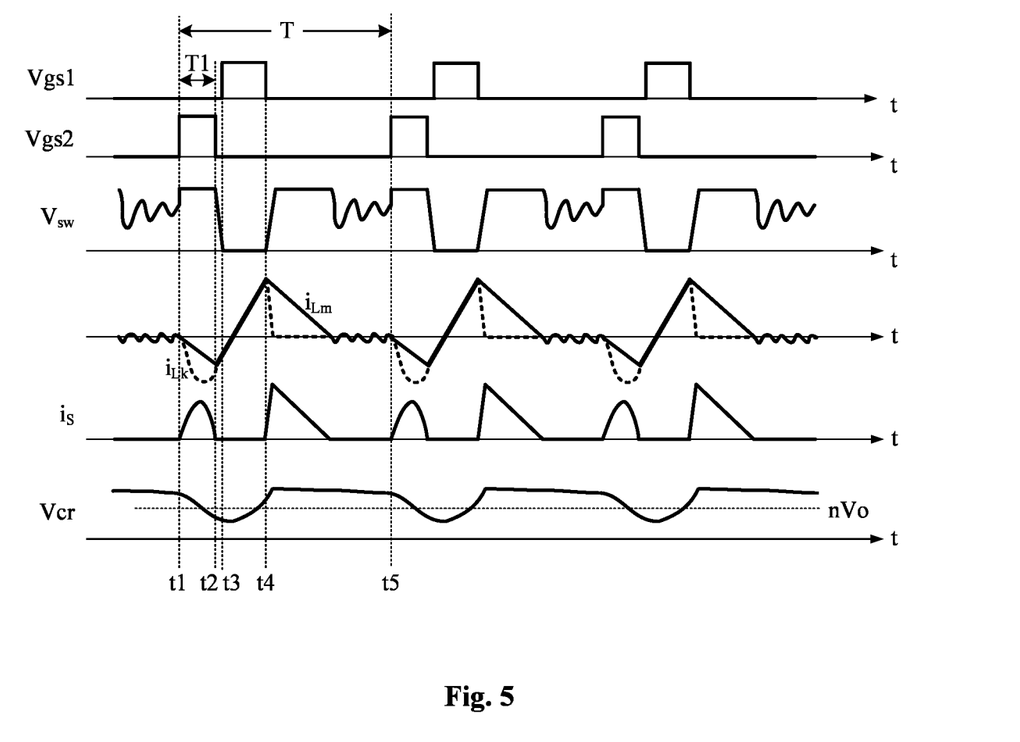
FIG. 5 shows a timing waveform diagram of a flyback converter in DCM mode provided according to an embodiment of the present disclosure.
Figure 6:
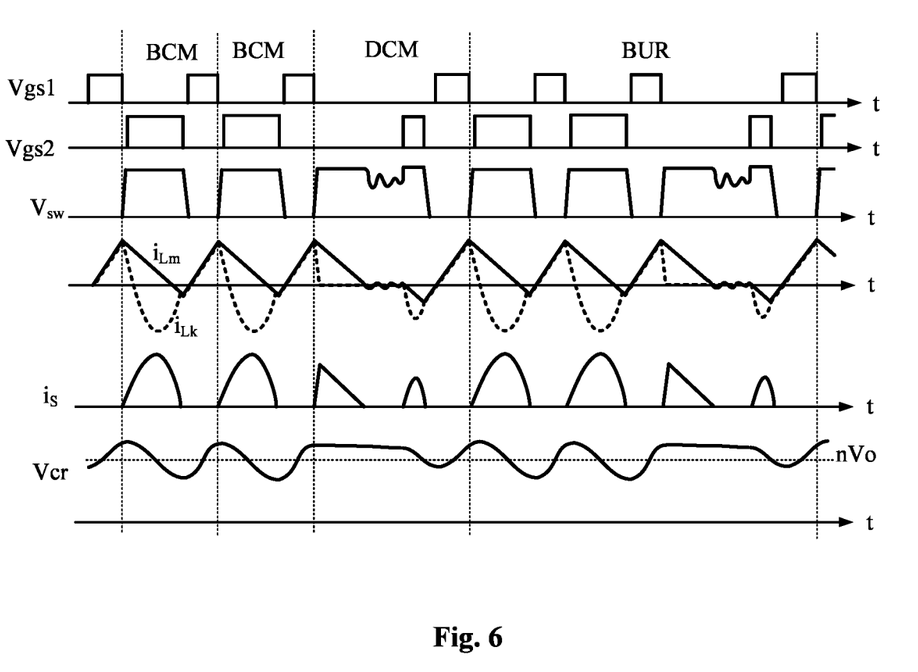
FIG. 6 shows a timing waveform diagram of a flyback converter in BUR mode provided according to an embodiment of the present disclosure.

Optionally, in some embodiments, the turn-off control circuit 124 is configured to start timing when receiving the turn-on trigger signal of the switch transistor Q2, and to output the turn-off trigger signal to trigger the switch transistor Q2 to be turned off when the timing value obtained by the timing reaches the first time T1. Wherein, the first time T1 has a preset fixed value; or the first time T1 is proportional to the turn-on period (denoted $t_{Q1}$) of the switch transistor Q1, i.e., T1=k*$t_{Q1}$. Referring to FIGS. 5 and 6, in DCM mode, a maximum value of an absolute value of the current (i.e., the excitation current $i_{Lm}$) through the excitation inductor of the flyback converter that can be reached in the first time T1 is less than a maximum value of an absolute value of the current (i.e., the excitation current iLm) through the excitation inductor of the flyback converter that can be reached in the turn-on period of the switch transistor Q1, in other words, in DCM mode, a maximum variation of the current (i.e., the excitation current $i_{Lm}$) of the excitation inductor of the flyback converter in the first time T1 is less than a maximum variation of the current (i.e., the excitation current $i_{Lm}$) of the excitation inductor of the flyback converter in the turn-on period of the switch transistor Q1.

In some other embodiments, the turn-off control circuit 124 is configured to obtain an increased value of the voltage (i.e., denoted Vcr) across the resonant capacitor Cr by sampling after the switch transistor Q1 is turned on in a previous switching cycle, to perform real-time detection on a decreased value of the voltage Vcr across the resonant capacitor Cr after the switch transistor Q2 is turned on in a current switching cycle, and to output a turn-off trigger signal to trigger the switch transistor Q2 to be turned off when the decreased value is equal to the increased amount. Optionally, the voltage Vcr across the resonant capacitor Cr can be obtained by sampling based on a signal of the auxiliary winding Na, that is, information of the voltage across the resonant capacitor Cr can be obtained by sampling the voltage across the auxiliary winding Na.

The second control unit 130 is configured to supply a control signal Vgs1 to control the switch transistor Q1 to be turned on/off. The second control unit 130 is specifically configured to generate a turn-on signal of the switch transistor Q1 after a predetermined dead time after the switch transistor Q2 is turned off, and to generate a turn-off signal of the switch transistor Q1 according to the compensation signal Vcomp. As an example, the second control unit 130 may be configured to obtain a current threshold value according to the compensation signal Vcomp, and to generate the turn-off signal of the switch transistor Q1 when the voltage Vcs across the sampling resistor Rcs reaches a voltage signal corresponding to the current threshold value. The turn-on signal of the switch transistor Q1 may be, for example, the control signal Vgs1 in high voltage level state, and the turn-off signal of the switch transistor Q1 may be, for example, the control signal Vgs1 in low voltage level state. Specifically, circuit structure and operating principle of the second control unit 130 can be understood with reference to the prior art, which does not affect technical proposals according to the present disclosure to solve the technical problems and will not be described in detail herein. Wherein, in one switching cycle, the dead time between the turn-off period of the switch transistor Q2 and the turn-on period of the first switch transistor Q1 is less than the preset time.

Operating processes of the flyback converter in different operation modes are described below with reference to the drawings.

In DCM mode, referring to FIG. 5, the first time T1 is less than the turn-on time $t_{Q1}$ of the switch transistor Q1, that is, in a switching cycle, the turn-on time (denoted $t_{Q2}$, where $t_{Q2}$=T1) of the switch transistor Q2 is less than the turn-on time $t_{Q1}$ of the switch transistor Q1. In this way, a problem, that a negative current on the excitation inductor Lm is too large and the inductor energy cannot be transmitted, can be avoided, and useless work can be avoided, which is beneficial to improving efficiency and quality of energy transmission between the primary side and the secondary side.

As shown in FIG. 5, at time t1, the control signal Vgs2 is changed into high voltage level and the switch transistor Q2 is turned on.

In a time period from t1 to t2, the switch transistor Q2 is in turn-on state, the resonant circuit of the flyback converter is turned on, the leakage inductor Lk of the transformer TR resonates with the resonant capacitor Cr, thereby discharging the resonant capacitor Cr, and energy on the resonant capacitor Cr is transferred to the secondary side portion of the converter. And during this process, the excitation current $i_{Lm}$ in reversed direction is formed on the excitation inductor Lm.

After the first time T1, at time t2, the control signal Vgs2 changes into low voltage level, and the switch transistor Q2 is turned off.

After the switch transistor Q2 is turned off, the excitation current $i_{Lm}$ in reversed direction formed on the excitation inductor Lm discharges the parasitic capacitance C1 of the switch transistor Q1, thereby reducing a drain-source voltage Vsw when the switch transistor Q1 is turned on. After a certain dead time, the drain-source voltage Vsw of the switch transistor Q1 decreases to zero voltage or near zero voltage at time t3, and the control signal Vgs1 also changes into high voltage level at time t3, so that the switch transistor Q1 is allowed to realize zero-voltage turn-on.

During a time period from t3 to t4, the switch transistor Q1 is in turn-on state, the input voltage Vin magnetizes the excitation inductor Lm and at the same time charges the resonant capacitor Cr, so that the excitation inductor Lm and the resonant capacitor Cr can store energy simultaneously. The excitation current $i_{Lm}$ on the excitation inductor Lm, the leakage inductor current $i_{Lk}$ on the leakage inductor Lk, and the voltage Vcr across the resonant capacitor Cr are all raised.

At time t4, the excitation current $i_{Lm}$ reaches a corresponding threshold value, the control signal Vgs1 changes into low voltage value and the switch transistor Q1 is turned off.

During a time period from t4 to t5, both the switch transistor Q1 and the switch transistor Q2 are in turn-off state, the flyback converter is operated to perform a freewheeling process, the excitation inductor Lm of the transformer TR is demagnetized, and energy on the excitation inductor Lm is transferred to the secondary side portion of the converter.

At time t5, the control signal Vgs2 changes into high voltage level, the switch transistor Q2 is turned on again, and the flyback converter enters a next switching cycle.

In boundary conduction mode (BCM mode), referring to FIG. 6, the operating process of the flyback converter in a switching cycle is substantially the same as that as shown in FIG. 5 above, similarities can be cross-referenced, and a difference is that: in BCM mode, the switch transistor Q1 and the switch transistor Q2 may be complementarily turned on in each switching cycle.

It should be noted that, in the examples according to embodiments of the present application, the switch transistor Q2 is turned on in advance, which allows the main switch transistor Q1 to realize zero-voltage turn-on in DCM mode, but the switch transistor Q2 itself is operated in hard turn-on (hard switching) mode. Therefore, in some preferred examples, when the switching frequency of the flyback converter is detected to be in high level, the flyback converter is controlled to operate in BUR (burst) mode, in order to reduce conduction loss of the switch transistor Q2. In the present embodiment, BUR mode can be used as an auxiliary mode, specifically, as an operation mode formed by combining BCM mode and DCM mode. In BUR mode, the flyback converter operates in BCM mode for N consecutive switching cycles, then operates in DCM mode for M consecutive switching cycles following the N consecutive switching cycles, and exits BUR mode after this cycle of modes is repeated for a predetermined number of operating cycles or when the switching frequency of the flyback converter is lower than or equal to a preset frequency, where both N and M are positive integers. In an example as shown in FIG. 6, N equals 2 and M equals 1. However, other implementation may be possible, N and M may be, for example, any other combination, which are not strictly limited by the present application.

To sum up, according to embodiments of the present disclosure, in a switching cycle, the resonant process performed based on the resonant capacitor Cr and the leakage inductor Lk of the transformer TR, and the demagnetization process of the excitation inductor Lm of the transformer TR are controlled to be performed in different time stages, thus the energy transmission between the primary side and the secondary side of the flyback converter includes two time stages in a switching cycle, so that when the same energy is transmitted, an effective value of a current of the secondary side is lower, the conduction loss of the rectifier of the secondary side is lower, and the switch transistor Q2 (auxiliary transistor) is controlled to be turned on in advance, which not only allows the main switch transistor Q1 to realize zero-voltage turn-on, reduces the conduction loss of the primary side and the secondary side, and reduces stress on the rectifier of the secondary side, but also reduces the ripples of the output voltage Vo and the current is of the secondary side in different time stages, thus finally improving operating efficiency of the converter. It can be understood that even if the switch transistor Q2 serving as the auxiliary transistor is implemented to be operated in hard turn-on mode, the conduction loss of the switch transistor Q2 is lower than that of the main switch transistor Q1 in normal applications, and according to embodiments of the present application, when the switching frequency of the flyback converter becomes high, the flyback converter can be controlled to operate in a complementary conduction mode formed by combining BCM mode and DCM mode, thereby further reducing the conduction loss of the switch transistor Q2 under hard turn-on operation.

Figure 7:
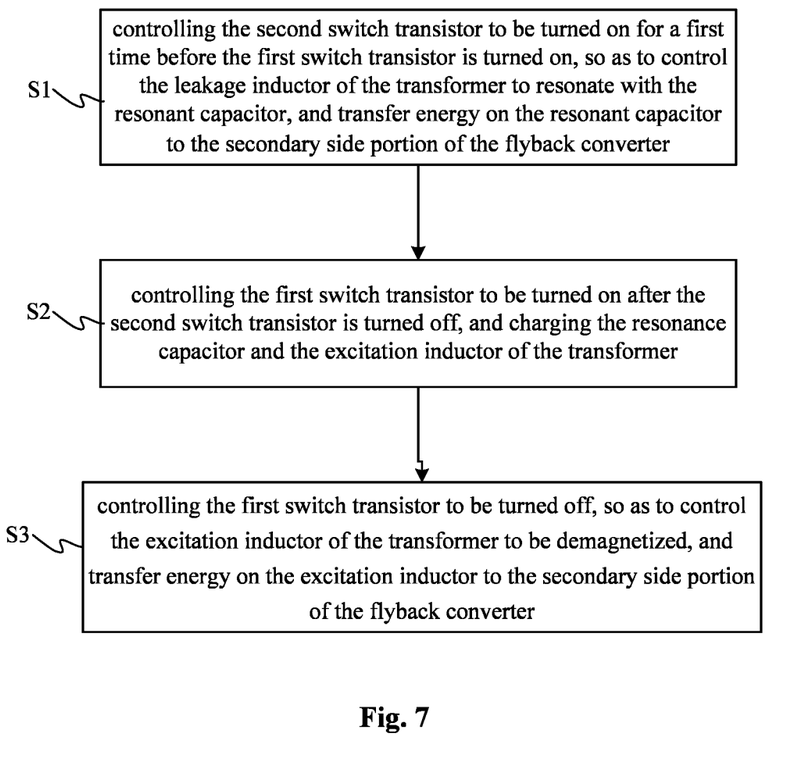
FIG. 7 shows a flow diagram of a control method of a flyback converter with high efficiency provided according to an embodiment of the present disclosure.

Further, the present disclosure further discloses a control method of a flyback converter with high efficiency, and the control method can be applied to the embodiments of the flyback converter which are described with reference to FIGS. 3 to 5. As shown in FIG. 7, the control method includes performing following steps:

In step S1, the second switch transistor is controlled to be turned on for a first time before the first switch transistor is turned on, so as to control the leakage inductor of the transformer to resonate with the resonant capacitor, and transfer energy on the resonant capacitor to the secondary side portion of the flyback converter.

In step S2, the first switch transistor is turned on after the second switch transistor is turned off, the resonance capacitor and the excitation inductor of the transformer are charged.

In step S3, the first switch transistor is controlled to be turned off to control the excitation inductor of the transformer to be demagnetized, so as to transfer energy on the excitation inductor to the secondary side portion of the flyback converter.

In an embodiment, method for controlling the second switch transistor to be turned on may comprise following steps: generating a compensation signal according to the output voltage of the flyback converter; generating a reference signal representing a frequency limitation threshold value of the flyback converter according to the compensation signal; generating a frequency detection signal according to the turn-on signal of the second switch transistor in a previous switching cycle; and when the frequency detection signal reaches the reference signal, controlling the second switch transistor to be turned on.

Method for controlling the second switch transistor to be turned off includes: starting timing when the second switch transistor is turned on, and controlling the second switch transistor to be turned off when the timing value obtained by the timing reaches the first time. Or in some other embodiments, method for controlling the second switch transistor to be turned off includes: in a previous switching cycle, obtaining an increased value of the voltage across the resonant capacitor by sampling after the first switch transistor is turned on, and in the current switching cycle, performing real-time detection on a decreased value of the voltage across the resonant capacitor after the second switch transistor is turned on, and controlling the second switch transistor to be turned off when the decreased value is equal to the increased value.

In some examples, the flyback converter operates in DCM mode, under this situation, a maximum value, that can be reached during the first time T1, of an absolute value of a current (i.e., the excitation current $i_{Lm}$) through the excitation inductor of the flyback converter is less than a maximum value, that can be reached during a turn-on period of the switch transistor Q1, of an absolute value of the current (i.e., the excitation current $i_{Lm}$) through the excitation inductor of the flyback converter. In some other examples, the flyback converter may operate in BCM mode, and under this situation, the switch transistor Q1 and the switch transistor Q2 are complementarily turned on during each switching cycle.

In some preferred examples, under a situation that the switching frequency of the flyback converter is higher than a preset frequency, the flyback converter operates in BCM mode for N consecutive switching cycles, then operates in DCM mode for M consecutive switching cycles following the N consecutive switching cycles, and exits BUR mode after this cycle of modes is repeated for a predetermined number of operating cycles or when the switching frequency of the flyback converter is lower than or equal to the preset frequency, where both N and M are positive integers.

Optionally, in some embodiments, the first time has a preset fixed value. In some other embodiments, the first time is proportional to the turn-on period of the first switch transistor.

In some embodiments, a technical scheme according to embodiments of the present disclosure can also be used in continuous conduction mode, where the freewheeling process corresponds to a time period during which the current through the excitation inductor decreases, and the above-mentioned first time stage lasts for a time period during which the current through the excitation inductor drops to zero.

It should be noted that the detailed implementation of each step in the control method of the flyback converter described above can be referred to the aforementioned embodiments of the flyback converter, and will not be repeated here.

Finally, it should be noted that, obviously, the above-described embodiments are only examples for a purpose of clearly illustrating the present invention and are not for limiting the implementations of the present disclosure. For those of ordinary skill in the art, other variations or alterations in different forms may be made on the basis of the above descriptions. An exhaustive list of all embodiments is not required and cannot be exhaustive. However, it will be apparent to those skilled in the art that obvious variations or modifications thereof will still fall within the scope of the present invention.

What is claimed is:

1. A flyback converter with high efficiency, comprising:
   a transformer;
   a first switch transistor and a second switch transistor, which are connected in series between a voltage input terminal and reference ground;
   a resonant capacitor, wherein a resonant loop of the flyback converter is formed based on the resonant capacitor and a leakage inductor of the transformer when the second switch transistor is in turn-on state;
   a control circuit, configured to generate control signals for the first switch transistor and the second switch transistor,
   wherein the control circuit is configured to: in a switching cycle, control the second switch transistor to be turned on for a first time before the first switch transistor is turned on, and control the second switch transistor to maintain turn-off state during a first time stage of the flyback converter, so as to control energy transmission between a primary side portion and a secondary side portion of the flyback converter to include two time stages in a switching cycle,
   wherein, the first time stage lasts for a set time period during a freewheeling process of the flyback converter.

2. The flyback converter according to claim 1, wherein the flyback converter operates in DCM mode and a maximum value of an absolute value of a current through an excitation inductor of the flyback converter during the first time is less than a maximum value of an absolute value of the current through the excitation inductor of the flyback converter during a turn-on period of the first switch transistor.

3. The flyback converter according to claim 1, wherein, when a switching frequency of the flyback converter is higher than a preset frequency, the flyback converter operates in BCM mode for N consecutive switching cycles, then operates in DCM mode for M consecutive switching cycles following the N consecutive switching cycles, and that cycle of modes repeats, where both N and M are positive integers.

4. The flyback converter according to claim 1, wherein timing is started when the second switch transistor is turned on, and a turn-off trigger signal for controlling the second switch transistor to be turned off is outputted when a timing value obtained by the timing reaches the first time.

5. The flyback converter according to claim 4, wherein the first time has a preset fixed value; or
   the first time is proportional to a turn-on period of the first switch transistor.

6. The flyback converter according to claim 1, wherein the control circuit comprises:
   a feedback unit, configured to generate a compensation signal according to an output feedback signal of the flyback converter;
   a first control unit, configured to generate a turn-on signal of the second switch transistor according to the compensation signal and a switching frequency of the flyback converter, and generate a turn-off trigger signal of the second switch transistor after the second switch transistor is turned on for the first time.

7. The flyback converter according to claim 6, wherein the first control unit comprises:
   a frequency limitation threshold setting circuit, configured to generate a reference signal representing a frequency limitation threshold value of the flyback converter according to the compensation signal;
   a frequency detection circuit, configured to generate a frequency detection signal according to the turn-on signal of the second switch transistor in a previous switching cycle;
   a comparison circuit, having a first input terminal receiving the frequency detection signal and a second input terminal receiving the reference signal, wherein the comparison circuit is configured to output a turn-on trigger signal when the frequency detection signal reaches the reference signal, so as to control the second switch transistor to be turned on;
   a turn-off control circuit, configured to output the turn-off trigger signal after the second switch transistor is turned on for the first time to control the second switch transistor to be turned off.

8. The flyback converter according to claim 7, wherein the reference signal and the frequency detection signal are both timing signals, or the reference signal and the frequency detection signal are both time-dependent voltage signals.

9. The flyback converter according to claim 7, wherein the turn-off control circuit is configured to: obtain an increased value of a voltage across the resonant capacitor by sampling after the first switch transistor is turned on in a previous switching cycle; and to perform real-time detection on a decreased value of the voltage across the resonant capacitor after the second switch transistor is turned on in a current switching cycle, and output the turn-off trigger signal when the decreased value is equal to the increased value.

10. The flyback converter according to claim 9, wherein the transformer comprises an auxiliary winding, and the voltage across the resonant capacitor is obtained by performing sampling based on a signal of the auxiliary winding.

11. A control method of a flyback converter with high efficiency, wherein the flyback converter comprises a transformer, a first switch transistor, a second switch transistor, and a resonant capacitor, and the control method comprises performing following steps in each switching cycle:

controlling the second switch transistor to be turned on for a first time before the first switch transistor is turned on, so as to control a leakage inductor of the transformer to resonate with the resonant capacitor and transfer energy on the resonant capacitor to a secondary side portion of the flyback converter;

controlling the first switch transistor to be turned on after the second switch transistor is turned off, so as to charge an excitation inductor of the transformer and the resonant capacitor;

controlling the first switch transistor to be turned off to control the excitation inductor of the transformer to be the demagnetized, so as to transfer energy on the excitation inductor to the secondary side portion of the flyback converter.

12. The control method according to claim 11, wherein method for controlling the second switch transistor to be turned on comprises:

generating a compensation signal according to an output voltage of the flyback converter;

generating a reference signal representing a frequency limitation threshold value of the flyback converter according to the compensation signal;

generating a frequency detection signal according to a turn-on signal of the second switch transistor in a previous switching cycle;

controlling the second switch transistor to be turned on when the frequency detection signal reaches the reference signal.

13. The control method according to claim 11, wherein the flyback converter operates in DCM mode, and a maximum value of an absolute value of a current through the excitation inductor of the flyback converter during the first time is less than a maximum value of an absolute value of the current through the excitation inductor of the flyback converter during a turn-on period of the first switch transistor.

14. The control method according to claim 11, wherein, when a switching frequency of the flyback converter is higher than a preset frequency, the flyback converter operates in BCM mode for N consecutive switching cycles, then operates in DCM mode for M consecutive switching cycles following the N consecutive switching cycles, and that cycle of modes repeats, where both N and M are positive integers.

15. The control method according to claim 13, wherein method for controlling the second switch transistor to be turned off comprises:

starting timing when the second switch transistor is turned on, and controlling the second switch transistor to be turned off when a timing value obtained by the timing reaches the first time.

16. The control method according to claim 14, wherein method for controlling the second switch transistor to be turned off comprises:

in a previous switching cycle, obtaining an increased value of a voltage across the resonant capacitor by sampling after the first switch transistor is turned on, and in a current switching cycle, performing real-time detection on a decreased value of the voltage across the resonant capacitor after the second switch transistor is turned on, and controlling the second switch transistor to be turned off when the decreased value is equal to the increased value.

17. The control method according to claim 11, wherein the first time has a preset fixed value; or the first time is proportional to a turn-on period of the first switch transistor.

* * * * *